United States Patent [19]

Beihoff et al.

[11] Patent Number: 4,683,515

[45] Date of Patent: Jul. 28, 1987

[54] MODULAR PTC THERMISTOR OVERLOAD PROTECTION SYSTEM

[75] Inventors: Bruce C. Beihoff; Avie Judes, both of Glendale; Michael S. Baran, Milwaukee, all of Wis.

[73] Assignee: Eaton Corporation, Cleveland, Ohio

[21] Appl. No.: 800,174

[22] Filed: Nov. 20, 1985

[51] Int. Cl.$^4$ .............................................. H02H 7/08
[52] U.S. Cl. .................................... 361/106; 361/24; 361/31
[58] Field of Search ...................... 361/24, 25, 27, 31, 361/103, 106

[56] References Cited

U.S. PATENT DOCUMENTS

| | | | |
|---|---|---|---|
| 2,438,495 | 3/1948 | Chatterjea | 361/106 |
| 2,896,127 | 7/1959 | Seeley | 361/106 |
| 3,032,690 | 5/1962 | Elliot | 361/106 |
| 3,526,809 | 9/1970 | Obenhaus | 361/106 |
| 3,697,863 | 10/1972 | Kilner | 361/106 |
| 3,794,950 | 2/1974 | Kilner | 338/23 |
| 3,909,675 | 9/1975 | Hirsbrunner et al. | 361/106 |

*Primary Examiner*—A. D. Pellinen
*Assistant Examiner*—Howard L. Williams
*Attorney, Agent, or Firm*—D. A. Rowe; L. G. Vande Zande

[57] ABSTRACT

A motor overload protection system (OL) that has a speed of operation fast enough so that it will always trip before the power switch (MC) has had time to operate if the turn-on control means (ON) is operated under overload conditions. In one version, modules (OL1,OL2) are provided having PTC thermistor sensors (PTC1,PTC2) bonded to resistance heaters (H1,H2) connected in the motor power circuit (L1,L2,L3), these sensors being supplied from a current source (CT) and being effective to shunt current to a protective trip device (TR) upon occurrence of an overload condition, there being an ambient temperature compensating PTC themisor (PTC3) in series in the sensor circuit (OLC). In another version, a thermal mass (TM) is preheated above ambient temperature by an ambient temperature compensating PTC thermistor (ATC) operated above its switching temperature level and a sensor PTC thermistor (ST) and a heater (HT) are also thermally coupled to the thermal mass (TM) with a bias resistor (R1) connected to the sensor thermistor (ST) to provide a step voltage output (OUT) on overload. The heater may be a PTC thermistor (HT) having a higher switching temperature for self-shutoff on higher than usual overload or may be a resistance heater (H3) with a PTC thermistor (TP) in series therewith for self-shutoff.

14 Claims, 17 Drawing Figures

MODULAR PTC THERMISTOR OVERLOAD PROTECTION SYSTEM

BACKGROUND OF THE INVENTION

PTC thermistor overload protection systems have been known heretofore. For example, O. H. Kilner U.S. Pat. No. 3,794,950, dated Feb. 26, 1974, shows an overcurrent protection system and sensor used therewith of the PTC thermistor type. A heater supplied by motor current heats the PTC thermistor which, upon reaching its anomaly point of 120° C., causes the voltage on a capacitor to reach a diode breakover value thereby to gate a thyristor and interrupt the motor power circuit. The PTC thermistor is draped by a first layer of insulation, an elongaged heater is looped over that, a second layer of insulation is draped over the heater and an elongated heat sink is wrapped over the second layer of insulation.

SUMMARY OF THE INVENTION

An object of the invention is to provide an improved modular PTC thermistor overload protection system.

A more specific object of the invention is to provide a modular PTC thermistor overload protection system using a mass analog of the load device such as an electric motor to be protected.

Another specific object of the invention is to provide a modular PTC thermistor overload protection system with improved stable ambient temperature compensation that creates a relatively constant temperature environment within the module regardless of the exterior ambient temperature.

Another specific object of the invention is to provide a modular PTC thermistor overload protection system with an improved ambient compensator that introduces thermal energy to a mass analog of the load device such as a motor to be protected in proportion to the difference between the ambient temperature and a predetermined higher temperature that is a functional characteristic of the ambient compensator that is used.

Another specific object of the invention is to provide a modular electric current level responsive system that uses a thermal mass analog of the load device such as a motor to be protected wherein the heat input to the thermal mass is supplied by a PTC thermistor type having a switching (transition) temperature high enough so that it only power limits itself under extreme overload conditions.

Another specific object of the invention is to provide a modular PTC thermistor overload protection system of the aforementioned type wherein the speed of operation of the protective trip means is fast enough to always trip before the power switching means has had time to operate long enough to apply enough power to cause motor energization if power is applied under overload conditions.

Another specific object of the invention is to provide a modular PTC thermistor overload protection system that is simple in construction and efficient in operation.

Other objects and advantages of the invention will hereinafter appear.

These and other objects of the invention are attained by providing a modular thermistor overload protection system comprising a power circuit including an electrical power supply source and a load device, switching means operable to connect said load device to said source and to disconnect said load device therefrom thereby to selectively energize or deenergize said load device, control means for operating said switching means, and protective means operable to sense an overload trip current in said power circuit and trip said control means so as to cause said switching means to disconnect said load device from said source comprising trip means for tripping said control means, a thermistor sensor in circuit with said trip means and having a switching temperature level at which its resistance abruptly changes, a control circuit for applying a bias voltage to said thermistor sensor, a heater responsive to an overload trip current in said power circuit for heating said thermistor sensor to its switching temperature level whereby its abrupt change in resistance causes operation of said trip means, and the speed of operation of said protective means being fast enough so that said trip means will always trip before said switching means has had time to operate if said control means is operated under overload conditions.

DESCRIPTION OF THE PREFERRED EMBODIMENTS

Figure 1:
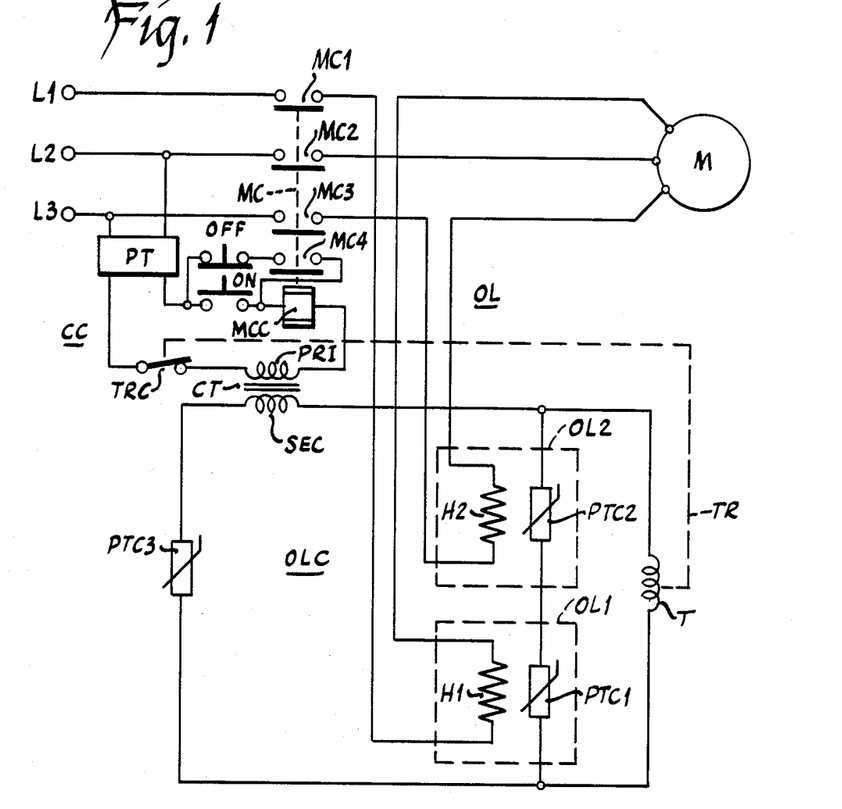
FIG. 1 is a circuit diagram showing a modular PTC thermistor overload protection system constructed in accordance with the invention.

Referring to FIG. 1, there is shown a circuit diagram of the modular PTC thermistor overload protection system OL constructed in accordance with the invention. As shown therein, a three phase alternating current power supply source represented by lines L1, L2 and L3 is connected, through normally open contacts MC1, MC2 and MC3 of a main contactor MC to a three phase alternating current motor M, there being heaters H1 and H2 connected between contacts MC1 and MC3 and the corresponding terminals of motor M, respectively.

A control circuit CC including a normally open "ON" switch ON, the coil MCC of main contactor MC, the primary winding PRI of a control transformer CT and a normally closed contact TRC of a trip relay TR in series is supplied with power across lines L2 and L3 through power transformer PT. A normally closed "OFF" switch OFF and a normally open maintaining contact MC4 of main contactor MC are connected in series across switch ON. A pair of sensing thermistors PTC1 and PTC2 are connected in series with an ambient temperature compensating thermistor PTC3 across secondary winding SEC of current transformer CT in overload circuit OLC. All three of these thermistors are of the positive temperature coefficient of resistance type (PTC). Trip coil T of trip relay TR is connected across thermistors PTC1 and PTC2. As shown by broken lines in FIG. 1, heater H1 and thermistor PTC1 are included in a first overload module OL1 whereas heater H2 and thermistor PTC2 are included in a second overload module OL2.

The circuit shown in FIG. 1 is typical of a motor overload system but is subject to modification in actual application without departing from the essential characteristics of the invention. A typical operation is as follows. To start the motor, the "ON" switch is closed momentarily to energize main contactor MC which closes its contacts MC1–MC4. Contacts MC1–MC3 connect the power supply to the motor to start the motor running whereas contact MC4 closes a maintaining circuit through the "OFF" switch in shunt of the "ON" switch which may then be released to allow it to open, thus maintaining main contactor MC energized. The motor currents in lines L1 and L3 flow through heaters H1 and H2 which may be of the known resistance wire type or the like bonded to thermistors PTC1 and PTC2, respectively, to cause generation of heat in proportion to the currents flowing therein and applying such heat within overload modules OL1 and OL2 to thermistors PTC1 and PTC2, respectively.

A current is applied from secondary winding SEC of control toroidal current transformer CT to overload circuit OLC. Most of this current flows through thermistors PTC1 and PTC2 because the resistance thereof is low under non-trip conditions because the heat input from the bonded heaters is low and, therefore, the current in trip winding T of trip relay TR is not sufficient to cause tripping of this relay. These thermistors PTC1 and PTC2 are bias heated to a controlled degree by the control current from the current source, that is, transformer CT. Such current also flows through ambient temperature compensating thermistor PTC3 which functions as follows. If the ambient temperature rises, for example, the resistance of thermistor PTC3 increases proportionally thereby reducing the current in overload circuit OLC. Although the rise in ambient temperature also increases the temperature of thermistors PTC1 and PTC2, the effect of this is offset by the aforesaid decrease in bias heating current therein so that there is no significant effect in the current flow in trip coil T. In a similar manner, if the ambient temperature drops, the resistance of ambient temperature compensating thermistor PTC3 decreases, allowing the bias heating current in the overload circuit OLC to increase to offset the decrease in temperature of thermistors PTC1 and PTC2. This ambient temperature drop also reduces the resistance of sensing thermistors PTC1 and PTC2, allowing them to conduct correspondingly greater current so that the effect on trip coil T will not be significant.

Figure 8:
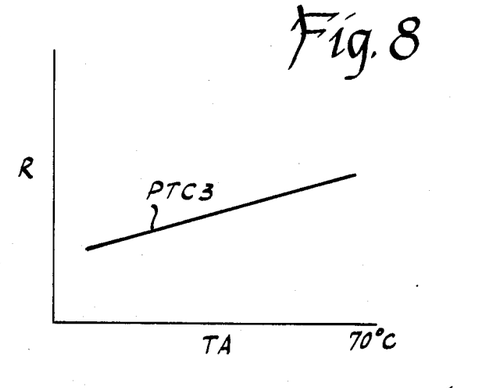
FIG. 8 is a graph showing operating characteristics of the ambient temperature compensating thermistor of FIG. 1.

FIG. 8 is a graph showing operating characteristics of overload circuit OLC in FIG. 1. FIG. 8 shows variation in resistance R of ambient temperature compensating thermistor PTC3 with reference to ambient temperature change TA. It will be apparent that, as shown in FIG. 8, this relationship is linear although it need not be strictly linear for operability so long as the resistance is directly proportional to temperature rather than inversely proportional thereto. Thermistor PTC3, having a positive temperature coefficient of resistance as shown by the rise in its resistance with rise in ambient temperature in FIG. 8, will compensate for any ambient temperature change effects on sensor thermistors PTC1 and PTC2. That is, thermistor PTC3 controls the self-heating of the sensor thermistors PTC1 and PTC2 in inverse proportion to the level of the ambient temperature change.

Let it be assumed that an overload condition occurs in the motor circuit. The shunt thermistors PTC1 and PTC2 carry the bulk of the current in the two parallel branches while trip coil T carries almost no current under normal load conditions. The overload currents in lines L1 and L3 flow through heaters H1 and H2, respectively, to heat thermistors PTC1 and PTC2 bonded thereto. When the motor load current reaches an overload level such that the heaters cause the sensor thermistors to exceed their switching temperature and change from their low resistance state to their high resistance state, this being a resistance increase of three to four orders of magnitude, the control current is shunted almost entirely to trip coil T. As a result, trip coil T of trip relay TR energizes to open its contact TRC. Contact TR1 deenergizes main contactor MC and also interrupts power to overload circuit OLC. Main contactor MC opens its contacts MC1–MC4 to interrupt the power supply circuit to the motor and to interrupt its own maintaining circuit at contact MC4. Trip relay TR now remains latched in its tripped condition with contact TR1 open until it is reset. Contact TRC may be reset closed in any conventional manner such as by depressing a reset button or a remote control circuit or the like.

If it is desired to stop the motor, the "OFF" switch is momentarily opened to interrupt the maintaining circuit of main contactor MC, causing contacts MC1–MC4 to open thereby to stop the motor.

Figure 2:
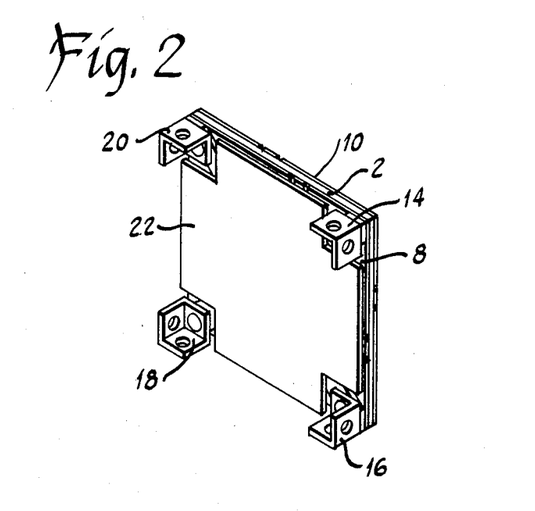
FIG. 2 is an isometric view of one of the heater-thermistor modules used in the system of FIG. 1.
Figure 3:
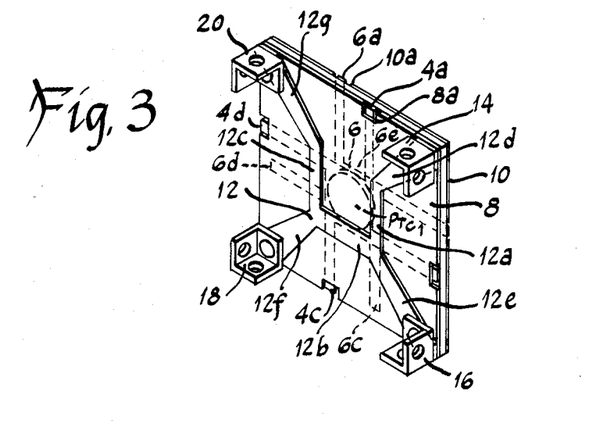
FIG. 3 is an isometric view of the module of FIG. 2 but with the front cover plate removed to show the heaters therein.
Figure 4:
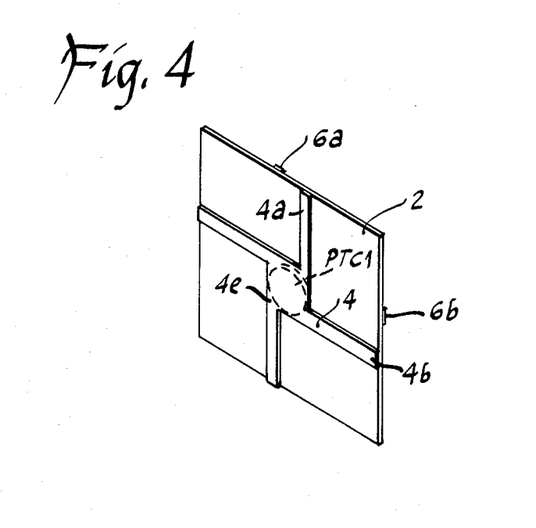
FIG. 4 is an isometric view of the module of FIG. 3 but with the internal plate and the back plate removed to show the thermistor and its opposite terminals.

Each overload module OL1 and OL2 is preferably constructed as shown in FIGS. 2–4. FIG. 2 shows the assembly of the overload module while FIG. 3 shows the heaters being exposed when the front thermal insulation plate has been removed and FIG. 4 shows the four-terminal PTC thermistor connector when the internal electrically insulating plate and back plate have been removed. As shown in FIG. 4, the module comprises an inner thermally and electrically insulating plate 2 having a hole in the center thereof for accommodating the thermistor PTC1. A pair of like four-terminal connectors 4 and 6 (FIGS. 4 and 3) are located on opposite sides of plate 2 with connector 6 turned over with respect to connector 4 so that the terminals of connectors 4 and 6 are spaced laterally from one another and are not superimposed over one another. For example, terminal 6a of connector 6 is spaced laterally toward the left from terminal 4a of connector 4 at the upper edge of the module as shown in FIG. 3 so as to facilitate making connections therefrom to the circuit of FIG. 1. In a similar manner, terminals 4b and 6b at the right edge of the module are spaced from one another, terminals 4c and 6c at the lower edge of the module are spaced from one another and terminals 4d and 6d at the left edge of the module are spaced from one another as shown in FIGS. 3 and 4. This spacing comes about naturally by providing two identical four-pronged connectors and turning one over with respect to the other and placing the two on opposite sides of inner plate 2 so that the rectangular central portions 4e and 6e are in contact with the opposite surfaces of thermistor PTC1 to make electrical connections thereto.

FIG. 3 shows the next step in the assembly of this module. As shown therein a pair of good heat conducting but electrically insulating internal and back plates 8 and 10 are placed on opposite sides of the subassembly of FIG. 4 flat against connectors 4 and 6, these plates having substantially the same rectangular or square dimension as inner plate 2 and each having notches such as 8a and 10a at all four edges thereof adjacent the outer end portions of the prongs such as 4a and 6a of connectors 4 and 6 to expose these end portions for making electrical connections therefrom to an external circuit. Next, a three-section heater 12 is placed against the outer surface of internal plate 8, this heater having three heater sections 12a, 12b and 12c connected to one another in a generally U-shape with arms 12d, 12e, 12f and 12g extending from the four corners thereof to the four corners of plate 8. Perforated laterally extending connectors 14, 16, 18 and 20 are electrically connected as by soldering, welding or the like to the end portions of arms 12d, 12e, 12f and 12g, respectively.

Heater 12 may be of the electrical resistance type or the like and provides for four different resistance heater values depending upon which pair of terminals are connected in the circuit. That is, connection of terminals 14 and 16 provides for one resistance value through section 12a, connection of terminals 16 and 18 provides for a different resistance value through section 12b, connection of terminals 18 and 20 provides for a third resistance value through section 12c and connection of terminals 20 and 14 provides for a fourth resistance value through sections 12a-c.

This heater may be of flat metal resistance material or thick film ceramic type heaters bonded to the surface of plate 8 or the like. The resistance may be entirely in sections 12a, 12b and 12c or, on the other hand, the resistance material may extend also into the four radiating arms 12d-12g. Because the overload module may be rotated into any of four different directions for connection to a heater element, the thermistor connectors shown in FIG. 4 are also provided with four connector prongs so that no matter which way the module is rotated, connection can also be made from the same side to the thermistor. With this arrangement, the user can select any one of four different heater ratings on the same module. That is, connection to terminals 14 and 16 selects heater section 12a, connection to terminals 16 and 18 selects heater section 12b, connection to terminals 18 and 20 selects heater section 12c and connection to terminals 20 and 14 selects all three heater sections 12a, 12b and 12c.

This heater element may be made from any one of a number of different materials such as copper for higher currents, flat metal resistance material for lower currents or a thick film or deposited metal film type heater bonded to the surface of plate 8 of ceramic or the like. Also, connectors 4 and 6 may be bonded and thus electrically connected to the opposite surfaces of PTC1. It will be apparent that different overload modules may have heaters of different resistance materials depending upon the rating and heating values desired. Thus, not only may the resistance material be different from module to module, but the thickness and width of resistor sections 12a, 12b and 12c may be set so as to get the proper heating value.

As shown in FIG. 2, a thermally and electrically insulating cover plate 22 is placed over heater 12 with the corners of this cover plate having notches at its four corners through which terminals 14, 16, 18 and 20 extend laterally.

Figure 5:
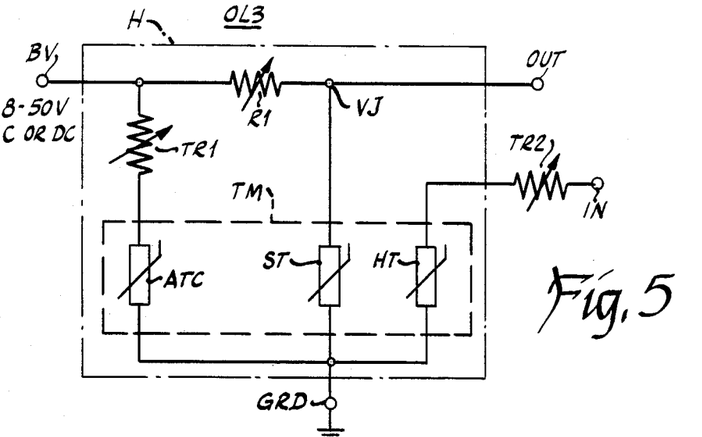
FIG. 5 is a circuit diagram of an alternative electric current level responsive system including a modified heater-thermistor module that could be used in the system of FIG. 1.
Figure 6:
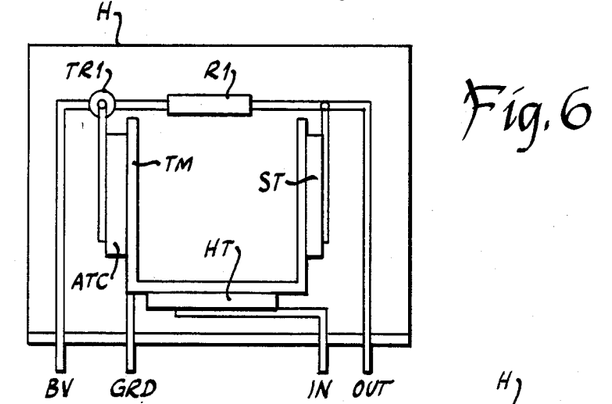
FIG. 6 is a front view of the module of FIG. 5.
Figure 7:
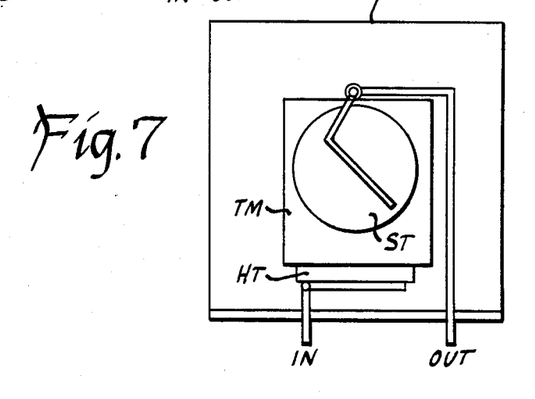
FIG. 7 is a right end view of the module of FIG. 6.

A miniature overload module OL3 is shown in FIGS. 5, 6 and 7, FIG. 5 showing the circuit diagram, FIG. 6 showing a front elevational view of the module and FIG. 7 showing a right end view of the module of FIG. 6. As shown in FIG. 5, the overload module OL3 is provided with an enclosure or housing represented by broken line H. A bias voltage is applied to this circuit at terminal BV and this bias voltage may be either A.C. or D.C. of, for example, in the range of 8-50 volts. This bias voltage causes current to flow through trim resistor TR1 and ambient temperature compensating thermistor ATC in series to ground terminal GRD. Ambient temperature compensating thermistor ATC is of the positive temperature coefficient (PTC) type as are sensing thermistor ST and also heater thermistor HT. All three thermistors are in close proximity to a thermal mass TM shown in FIG. 5 as a broken line surrounding these three thermistors so that heat is readily conducted through this thermal mass from any one of these thermistors to the others depending upon which one has a higher temperature. Thermal mass TM may be a plate of good heat conducting material such as copper or the like hereinafter described in connection with FIG. 6. Current also flows from bias voltage terminal BV through a large voltage dividing bias resistor R1, voltage junction VJ and sensor thermistor ST to ground GRD. As a result of this current flow, a voltage will appear at junction VJ having a magnitude dependent upon the relative resistances of R1 and sensor thermistor ST and this voltage will vary in direct proportion to variation in the resistance of sensor thermistor ST. The voltage at junction VJ is applied directly to output terminal OUT. When sensor thermistor ST is at ambient temperature, the resistance thereof will be low and consequently the voltage at the output terminal will be low which represents the "OFF" condition as far as operation of any overload protective device connected to the output terminal is concerned. Internal heating in thermistor ST will be negligible due to bias resistor R1.

Figure 9:
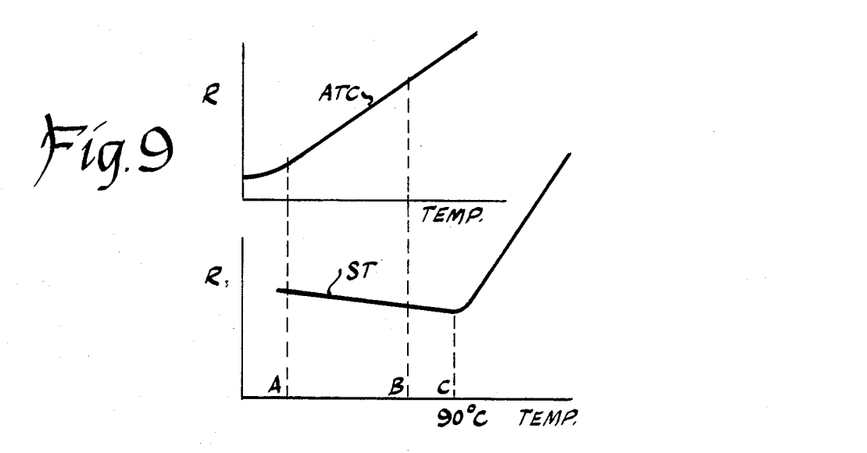
FIG. 9 is a graph showing operating characteristics of the ambient temperature compensating and sensing thermistors of FIG. 5.
Figure 10:
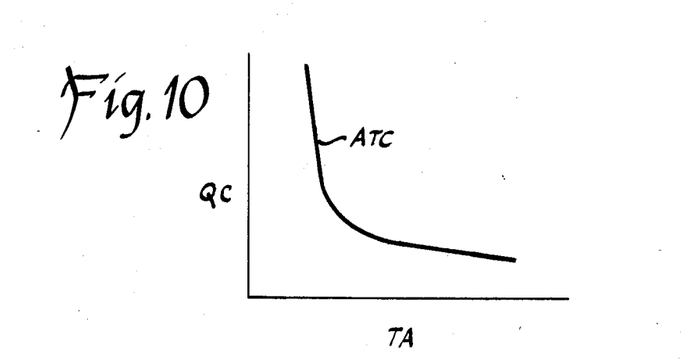
FIG. 10 is a graph showing the heat input to the thermal mass characteristic of the ambient temperature compensating thermistor of FIG. 5.

The aforementioned current flow through ambient temperature compensating thermistor ATC causes this thermistor to inject heat into the thermal mass TM of the module in proportion to the difference between the ambient temperature (−20° C. to 70° C.) and the switching temperature of this thermistor ATC (80° C., for example). This current heats thermistor ATC and raises it to or beyond its switching temperature so as to limit its self-heating. This creates a relatively constant temperature environment above ambient temperature in the thermal mass TM within the module enclosure irrespective of exterior ambient temperature. This provides a stable ambient temperature compensation to the module's output. As shown in the upper portion of FIG. 9, the temperature of thermistor ATC has been raised above its transition or switching temperature into the operating range A-B. Referring to this curve ATC at the upper portion of FIG. 9, it will be apparent that the resistance R of thermistor ATC will increase with temperature increase thereby tending to maintain the temperature of the thermal mass constant. Thus, if the temperature of the thermal mass decreases, the resistance of thermistor ATC will decrease causing a proportionate increase in current therethrough thereby to inject more heat into the thermal mass. On the other hand, if the temperature of the thermal mass should increase, the resistance of thermistor ATC will increase as shown at the upper portion of FIG. 9 causing a proportionate decrease in current therethrough thereby to inject less heat into the thermal mass. This variation in the amount of heat injected into the thermal mass is shown in FIG. 10. As shown therein, a large amount of heat QC is injected into the thermal mass by ambient temperature compensating thermistor ATC at low ambient temperature TA but as the ambient temperature increases, there is a decrease in the rate of injection of heat, the relation being asymptotic in the operating range as shown by the right-hand portion of the curve in FIG. 10.

Thermistor HT in FIG. 5 functions as a heater thermistor and responds to the overload current of a motor or the like to apply heat to thermal mass TM, for example, a motor current mirror, or the like, and therethrough to sensor thermistor ST. For this purpose, input terminal IN which receives the overload current is connected through a trimming resistor TR2 and heater thermistor HT to ground terminal GRD. Trimmer resistor TR2 functions in the normal manner to limit the current to heater thermistor HT and may be given a preset value or adjustability as indicated by the arrow therethrough. When the input current at terminal IN reaches an overload value, heater thermistor HT will transmit through thermal mass TM sufficient heat to sensor thermistor ST to cause the resistance of the latter to rise to a point where the voltage at junction VJ reaches a trip value. This trip value of voltage will be applied to terminal OUT to operate an overload trip device or the like as hereinbefore described to connect with FIG. 1. The heat input is applied to thermal mass TM, via a motor current mirror or the like, which controls the heating rate of the heater input thermistor HT in proportion to motor current. The cold resistance of thermistor HT may be stabilized by addition of trim resistor TR2. The switching temperature of the input is chosen high enough, greater than 140° C. assuming that thermistor HT is a 140° C. thermistor, so that it only power limits itself under emergency overload conditions. In other words, only under emergency overload conditions such as when the temperature of heater thermistor HT goes above 140° C. will its resistance suddenly increase at such switching temperature of 140° C. thereby to quickly limit the current input to the overload module OL3. In this way, heater thermistor HT will shut itself off under such emergency overload conditions. Under normal overload conditions, heater thermistor HT will only apply heat through thermal mass TM to sensor thermistor ST which will reach its switching temperature at 90° C. or the like thereby to cause rapid rise of the voltage at the output terminal. This function is shown by the lower curve at FIG. 9 wherein sensor thermistor ST resistance is plotted against temperature. As shown therein, through the ambient temperature range A-B resistance R of sensor thermistor ST has a small negative temperature coefficient of resistance characteristic so that its resistance change is either negligible or in certain applications such as where the circuit is fed with a current source it has a desired amount of self compensating characteristic. As shown in FIG. 9, the switching temperature of sensor thermistor ST may be 90° C. or the like. When heated to this temperature by heater thermistor HT which represents an overload condition, the resistance of sensor thermistor ST abruptly switches to a fast rising characteristic with respect to increase in temperature. This causes the voltage at the output terminal of the circuit in FIG. 5 to rise above its trip value thereby to perform a protective function.

The physical construction of overload module OL3 is shown in FIGS. 6 and 7. As shown therein, the module comprises a housing H which is filled with electrical and thermal insulation. Thermal mass TM is preferably in the form of a sheet of copper or the like formed into a U-shaped configuration which is connected to ground GRD. Thermistors ATC, ST and HT have one surface bonded or electrically and mechanically connected to the left, right and bottom surfaces of this U-shaped thermal mass TM. The other surface of thermistor ATC is connected through trim resistor TR1 in one branch to bias voltage BV and in another branch through resistor R1 to output terminal OUT and also to the other surface of sensor thermistor ST. The other surface of heater thermistor HT is connected to input terminal IN. As shown in FIG. 7, the thermal mass TM assembly is substantially smaller than housing H to provide sufficient room for adequate thermal and electrical insulation therearound to prevent rapid heat loss from thermal mass TM. This natural mass-heater relation of the module provides an accurate, compact energy integration model of the motor or device that it is designed to protect.

Figures 11, 12:
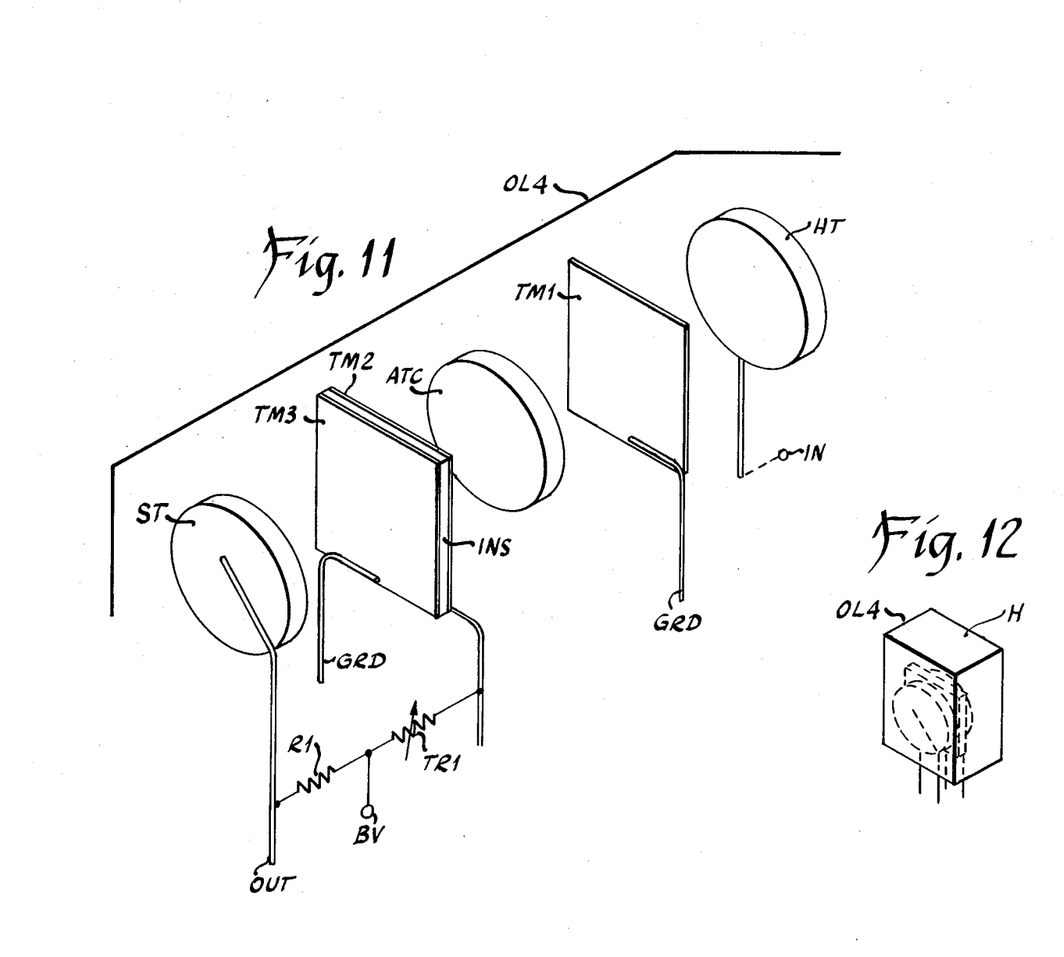
FIG. 11 is an exploded isometric view of a modified module structure for the three thermistors of FIG. 5.
FIG. 12 is an isometric assembled view of the module of FIG. 11 showing in broken lines the module inside the insulation in which the module is embedded.

FIGS. 11 and 12 show an alternative modified overload module OL4, FIG. 11 showing an exploded isometric view of the parts thereof and FIG. 12 showing an isometric assembly view of the module. Reference characters like those shown in FIG. 5 are used for like parts in FIG. 11. As shown therein, thermistors HT, ATC and ST are stacked one over the other. Also, thermal mass TM such as the U-shaped copper plate of FIG. 6 has been divided into three parts herein including rectangular or square thermal mass portions such as copper plates TM1, TM2 and TM3 with plate TM1 being sandwiched between thermistors HT and ATC and copper plates TM2 and TM3 being sandwiched between thermistors ATC and ST with an electrically insulating plate INS between electrically conductive plates TM2 and TM3. With copper plates TM1 and TM3 connected to common ground GRD, bias voltage terminal BV connected through resistor R1 to thermistor ST and also through trim resistor TR1 to copper plate TM2, and thermistor HT connected either directly or through a trim resistor to terminal IN, the circuit will be the same as that shown in FIG. 5. In this circuit, electrically conductive plate TM1 connects one side of thermistors HT and ATC to ground while electrically conductive plate TM3 connects one side of thermistor ST to ground. The other sides of these three thermistors are connected to junction VJ and terminals BV, IN and OUT as shown in FIG. 11. FIG. 12 shows the stacked parts of FIG. 11 embedded in an electrically and thermally insulating housing H with the terminals extending down through the bottom of the housing for connection in an electrical system.

FIGS. 13-17 show another modification of the overload module of FIGS. 5-7, FIG. 13 showing the circuit diagram thereof and FIGS. 14-17 showing the mechanical construction of the module. The circuit of FIG. 13 differs from the circuit in FIG. 5 primarily in that a resistance heater such as a thick film heater H3 or the like is used for heating the thermal mass and a temperature protective thermistor TP of the positive temperature coefficient of resistance type or the like is used in series therewith for overload signal input shutoff in the event the overload signal should rise to an emergency value far above the usual overload signal value. The physical construction of overload module OL5 shown in FIGS. 14-17 also differs substantially from that shown in FIGS. 6 and 7.

Figure 13:
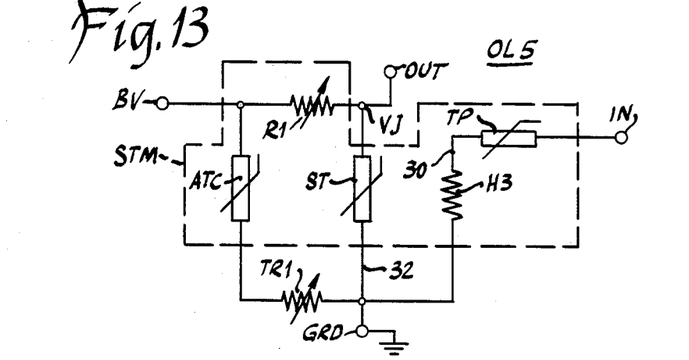
FIG. 13 is a circuit diagram of another electric current level responsive system including a modified heater-thermistor module that could be used in the system of FIG. 1.

As shown in FIG. 13, bias voltage terminal BV is connected through ambient temperature compensating thermistor ATC and trimming resistor TR1 to ground terminal GRD as in FIG. 5. Also, bias voltage terminal BV is connected through resistor R1 and sensor thermistor ST to ground terminal GRD with the junction VJ between resistor R1 and thermistor ST being connected to output terminal OUT as in FIG. 5. However, input terminal IN is connected through a temperature protective thermistor TP and thick film heater H3 to ground terminal GRD. A substrate thermal mass STM is provided as shown in broken lines to which resistors R1 and TR1 and heater H3 are deposited as thick films and to which thermistors ATC, ST and TP are mounted as hereinafter described in connection with FIGS. 14-17. Ambient temperature compensating thermistor ATC performs the ambient temperature compensation by heat injection as hereinbefore described in connection with FIG. 5. Also, sensor thermistor ST functions in a similar manner as hereinbefore described in connection with FIG. 5 to provide an output voltage signal at terminal OUT when it is heated above its switching temperature by heater H3. Heater H3 functions in a manner generally similar to that hereinbefore described to heat substrate thermal mass STM in response to overload current flowing therethrough so as to cause the sensor thermistor ST to provide a trip signal. Temperature protective thermistor TP is provided for input signal shut-off purposes in the event the overload signal should far exceed the normal overload values. For example, this thermistor TP may have a switching temperature of 140° C. similar to that described for heater thermistor HT in FIG. 5 so that at such a high temperature its resistance will increase at a steep slope to shut off current to heater H3.

Figure 14:
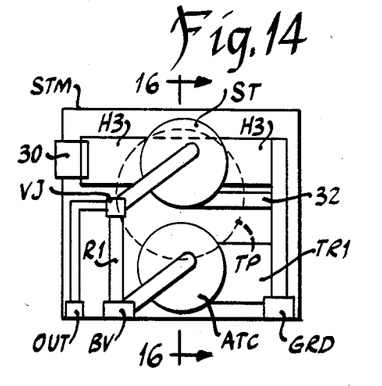
FIG. 14 is a front view of the module of FIG. 13.
Figure 15:
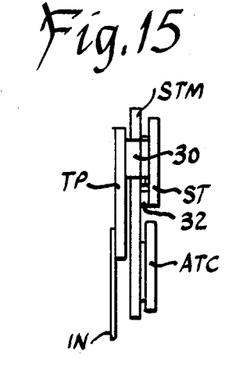
FIG. 15 is a left side view of the module of FIG. 14.
Figure 16:
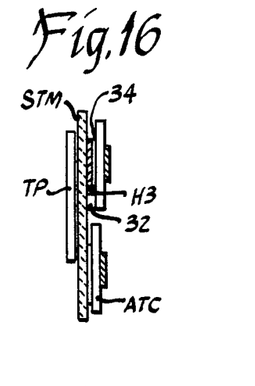
FIG. 16 is a sectional view of the module of FIG. 14 along line 16—16 thereof.
Figure 17:
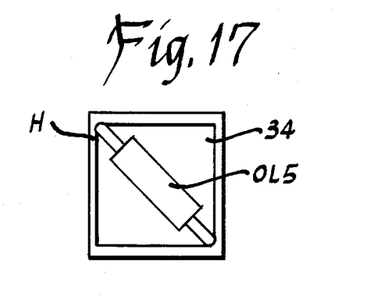
FIG. 17 is an assembled view of the module of FIGS. 13-16 showing the same mounted in an enclosure and embedded in thermal-electrical insulation.

As shown in FIG. 14, thick film heater H3 is deposited on substrate thermal mass STM and is connected at one end to ground terminal GRD and at its other end through conductor 30 and temperature protective thermistor TP to input terminal IN, this input terminal being shown in FIG. 15. Ground terminal GRD is also connected through connector 32 to one side of sensor thermistor ST with the other side of this thermistor being connected through junction VJ to output terminal OUT and also from junction VA through resistor R1 to bias voltage terminal BV, there being a layer of electrical insulation 34 between sensor thermistor ST and heater H3 as shown in FIG. 16. Ground terminal GRD is also connected through trim resistor TR1 to one side of thermistor ATC the other side of which is connected to bias voltage terminal BV. Resistors TR1 and R1 and heater H3 are preferably thick film layers deposited directly on substrate STM whereas the other elements are mounted on the substrate and either connected to the thick films or insulated therefrom as hereinbefore described. The overload module OL5 of FIGS. 13-16 is mounted within housing H as shown in FIG. 17 and this housing is filled with electrical and thermal insulation 34 surrounding module OL5. Suitable connectors, not shown, are provided through the wall of this housing for connection to the four terminals shown in FIGS. 14 and 15.

While the apparatus hereinbefore described is effectively adapted to fulfill the objects stated, it is to be understood that the invention is not intended to be confined to the particular preferred embodiment of modular PTC thermistor overload protection system disclosed, inasmuch as they are susceptible of various modifications without departing from the scope of the appended claims.

We claim:

1. A modular thermistor overload protection system comprising:

a power circuit including an electrical power supply source and a load device;

switching means operable to connect said load device to said source and to disconnect said load device therefrom thereby to selectively energize or deenergize said load device;

control means for operating said switching means;

and protective means operable to sense an overload trip current in said power circuit and trip said switching means so as to cause said switching means to disconnect said load device from said source comprising:

trip means for directly tripping said switching means without delay;

a thermistor sensor in circuit with said trip means and having a switching temperature level at which its resistance abruptly changes;

a control circuit for applying an electrical bias to said thermistor sensor;

heater means responsive to an overload trip current in said power circuit for heating said thermistor sensor to its switching temperature level whereby its abrupt change in resistance causes direct operation of said trip means;

and the speed of operation of said protective means being fast enough due to said direct operation of said trip means so that said trip means will always trip before said switching means has had time to operate long enough to apply enough power to cause motor energization if said control means is operated to apply power under overload conditions.

2. The modular thermistor overload protection system according to claim 1, wherein:

said thermistor sensor is a PTC thermistor;

and said trip means and said PTC thermistor are connected in parallel in said control circuit so that the abrupt increase in resistance of said PTC thermistor at said switching temperature level causes current to be directly shunted to said trip means to operate the same.

3. The modular thermistor overload protection system according to claim 1, wherein:
said control circuit comprises an ambient temperature compensating thermistor in circuit with said thermistor sensor for varying the current in said control circuit with change in ambient temperature thereby to compensate for ambient temperature effects on said thermistor sensor.

4. The modular thermistor overload protection system according to claim 1, wherein:
said thermistor sensor is a PTC thermistor sensor the resistance of which abruptly increases at said switching temperature level;
and said control circuit comprises an ambient temperature compensating PTC thermistor in series with said PTC thermistor sensor for inversely varying the current in said control circuit in response to ambient temperature changes.

5. The modular thermistor overload protection system according to claim 1, wherein:
said thermistor sensor is a PTC thermistor sensor the resistance of which abruptly increases at said switching temperature level;
and said control circuit comprises a thermal module having a thermal mass and said PTC thermistor sensor and said heater means are mounted in close proximity thereto in good heat conduction relationship.

6. The modular thermistor overload protection system according to claim 5, wherein:
said control circuit also comprises an ambient temperature compensating PTC thermistor mounted in said thermal mass and having a lower switching temperature level than said PTC thermistor sensor and being energized by said bias voltage to supply thermal energy to said mass in proportion to the difference between the ambient temperature and said lower switching temperature level.

7. The modular thermistor overload protection system according to claim 6, wherein:
said heater means comprises a PTC thermistor having a switching temperature level substantially higher than the switching temperature level of said PTC thermistor sensor so as to power-limit itself under extremely high overload currents.

8. The modular thermistor overload protection system according to claim 7, wherein:
said thermal mass comprises a good heat conducting member in close proximity to said ambient temperature compensating and heater PTC thermistors to which each of them contributes thermal energy.

9. The modular thermistor overload protection system according to claim 8, wherein:
said thermal module also comprises means for thermally insulating said thermal mass and said PTC thermistors from outside effects.

10. The modular thermistor overload protection system according to claim 8, wherein:
said thermal mass is a plate of good heat conducting and electrical conducting material such as copper to which one side of each of said PTC thermistors is electrically and thermally connected.

11. A modular electric current level responsive system comprising:
a module comprising an insulated thermal mass member representing the thermal mass analog of an electrically powered device to be protected from overcurrent;
an electrical power supply source;
an ambient temperature compensating PTC thermistor having a first switching temperature level and being in contiguous heat transfer relation to said thermal mass;
means for connecting said source to said thermistor to heat it to said first switching temperature level so as to limit its self-heating and apply to said thermal mass thermal energy in proportion to the difference between ambient temperature and said first switching temperature thereby to provide a relatively constant temperature environment within said module regardless of the exterior ambient temperature and a stable ambient temperature compensation for the output of the system;
a heater means in contiguous heat transfer relation to said thermal mass;
means for controlling the heating rate of said heater means in proportion to the current of said electrically powered device to be protected from overcurrent and applying the heat to said thermal mass;
a PTC thermistor sensor having a higher switching temperature level in contiguous heat transfer relation to said thermal mass;
an output connected to said PTC thermistor sensor;
and circuit means for applying an electrical bias from said source to said PTC thermistor sensor whereby a protective signal appears at said output when said PTC thermistor sensor is heated by said thermal mass to its said higher temperature level due to overcurrent in said electrically powered device.

12. The modular electric current level responsive system according to claim 11, wherein:
said heater means is a PTC thermistor-heater having a still higher switching temperature level which normally operates below said still higher switching temperature level to cause said protective signal to appear at said output and said still higher switching temperature level being high enough so that said thermistor-heater power limits itself only under extreme overcurrent conditions in said electrically powered device.

13. The modular electric current level responsive system according to claim 12, wherein:
said means for controlling comprises a trim resistor for stabilizing the cold resistance of said PTC thermistor-heater.

14. The modular electric current level responsive system according to claim 11 wherein:
said heater means comprises a resistance heater and a heater control PTC thermistor in circuit therewith and having a still higher switching temperature level which normally operates below said still higher switching temperature level to allow said protective signal to appear at said output under said overcurrent occurrance and said still higher switching temperature level being high enough so that said heater control PTC thermistor power limits said resistance heater only under extreme overcurrent conditions in said electrically powered device.

* * * * *